(12) United States Patent
Meyer et al.

(10) Patent No.: US 10,095,631 B2
(45) Date of Patent: Oct. 9, 2018

(54) SYSTEM ADDRESS MAP FOR HASHING WITHIN A CHIP AND BETWEEN CHIPS

(71) Applicant: ARM Limited, Cambridge (GB)

(72) Inventors: Paul Gilbert Meyer, Rollingwood, TX (US); Gurunath Ramagiri, Austin, TX (US)

(73) Assignee: Arm Limited, Cambridge (GB)

( * ) Notice: Subject to any disclaimer, the term of this patent is extended or adjusted under 35 U.S.C. 154(b) by 378 days.

(21) Appl. No.: 14/965,214

(22) Filed: Dec. 10, 2015

(65) Prior Publication Data

US 2017/0168954 A1 Jun. 15, 2017

(51) Int. Cl.
*G06F 12/1018* (2016.01)
*G06F 3/06* (2006.01)
*G06F 13/40* (2006.01)

(52) U.S. Cl.
CPC ........ *G06F 12/1018* (2013.01); *G06F 3/0604* (2013.01); *G06F 3/067* (2013.01); *G06F 3/0659* (2013.01); *G06F 13/4068* (2013.01); *G06F 2212/657* (2013.01)

(58) Field of Classification Search
CPC .. G06F 12/1018; G06F 3/0604; G06F 3/0659; G06F 3/067; G06F 13/4068; G06F 2212/657
See application file for complete search history.

(56) References Cited

U.S. PATENT DOCUMENTS

2003/0097467 A1* 5/2003 Sano .................. G06F 12/0831
709/238

* cited by examiner

*Primary Examiner* — Eric Cardwell
(74) *Attorney, Agent, or Firm* — Leveque IP Law, P.C.

(57) ABSTRACT

A system and method for accessing on-chip and off-chip memory in an integrated circuit data processing system. The system includes a number of nodes connected by an interconnect and also includes system address map logic in which a node register table is accessed using a hash function of the memory address to be accessed. A node identifier stored in a register of the node register table is an identifier of a remote-connection node when the memory address is in off-chip memory addresses and an identifier of a local-connection node when the memory address is in the off-chip memory. Transaction requests are routed using the node identifier selected using the hash function.

16 Claims, 8 Drawing Sheets

SYSTEM ADDRESS MAP FOR HASHING WITHIN A CHIP AND BETWEEN CHIPS

BACKGROUND

An integrated circuit or chip may contain a number of functional blocks or devices, such as processing cores, memories and peripherals for example, that are interconnected to enable data to be transferred during operation. Simpler circuits may communicate via one or more shared bus structures. More complex integrated circuits, such as System-on-Chip (SoC) circuits and circuits having multiple processing cores for example, may transport data using a dedicated interconnect structure such as a bus or network.

In order to facilitate modular design, with reuse of functional blocks, the properties of the communication structure may be defined by a standard protocol. Further, to cope with increasing complexity, an integrated circuit with multiple functional blocks may be configured as a network in which functional blocks communicate via an interconnect circuit. The interconnect circuit couples to a number of linked nodes at connection points the nodes provide interfaces to functional blocks, such as processing units, memory controller and input/output devices, for example.

Data transactions may be routed to target nodes of the network using a System Address Map. The System Address Map is logic circuit that determines which node of the network should be targeted when a master device requests access to a given memory address.

The target node may be a local node on the same chip as the master device or may be a node on a different chip.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
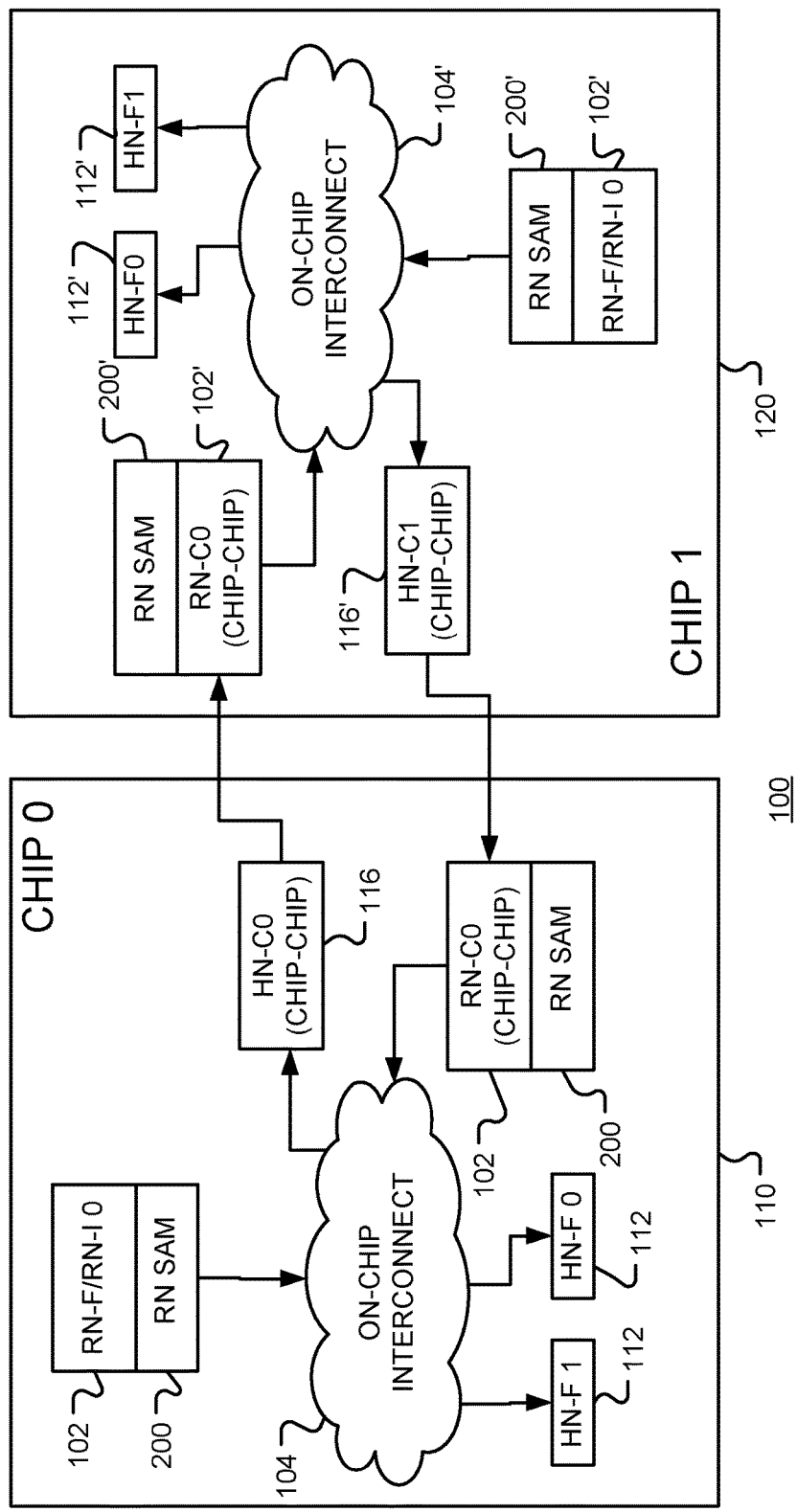
FIG. 1 is a block diagram of a multichip data processing system, in accordance with various representative embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

A data processing system may be configured as one or more integrated circuits. In turn, an integrated circuit with multiple functional blocks or devices may be configured as a network, in which functional blocks or nodes communicate via an interconnect circuit. The functional blocks may be processing units, memory controllers, and input/output devices, for example.

FIG. 1 is a block diagram of a data processing system 100, in accordance with various representative embodiments. The system 100 may be implemented as a number of integrated circuits, 110 and 120 for example.

In the simplified example shown, the integrated circuit 110 includes one of more transaction generators or Request Nodes (RN's) 102, such as processing cores, clusters of processing cores, I/O masters, or other devices (such as a graphics post processor (GPP), a digital signal processor (DSP), a field programmable gate array (FPGA) or an application specific integrated circuit (ASIC) device). The request nodes 102 are coupled via interconnect circuit 104, to each other and, via home nodes 112 to other devices such as data resources nodes. Transaction requests, such as memory read/write requests or requests to access memory-mapped peripherals, originate at a Request Node (RN) 102. In some embodiments, where a data resource is shared for example, the RN's are categorized as RN-F (Fully coherent) nodes such as processing cores, RN-I (I/O coherent) nodes such I/O masters, and RN-C (connection) nodes that are request nodes that enable Chip-to-Chip transactions to be performed. In the example shown in FIG. 1, requests that are sent to chip 0 from chip 1 are received by request node RN-C0. An RN-C node acts as the receiving interface block for requests of this type.

The network in integrated circuit 110 includes one or more Home Nodes (HN's) 112. Each Home Node serves as an intermediate device to a data resource and is responsible for unique locations within the system memory space. For example, home nodes (HN's) may serve requests from Request Nodes (RN's) for normal memory accesses and can have cache memory built-in. Such nodes may be, for example, in groups of 4-8 with each node responsible for a subset of the addresses within a given range of memory addresses.

Requests originating from RN-F/RN-I request nodes that access normal memory will be serviced by HN-F home nodes 112 that may be fully coherent. If an HN-F node does not contain data from the requested memory location in its cache, it may further access the data from a downstream memory. The HN-F home nodes 112 will be referred to as 'local-connection nodes' and provide connections to local (on-chip) data resources.

Home node (HN-C) 116 is a node for Chip-to-Chip transactions in a multichip system. Requests from RN-F/RN-I nodes that are serviced by an HN-F nodes in another chip may be sent through an HN-C node. The HN-C node acts as an interface block to other chips in the system and sends transactions to an RN-C node of the other chip. Home nodes such as (HN-C) 116 may be coupled to corresponding connection points of other chips and may serve as interface nodes to access nodes on a different chip (102' on chip 120, for example) in a multichip system. The nodes HN-C 116 will be referred to as 'remote-connection nodes' and provide connections to data resources on a different chip.

The network may contain any number of nodes, including multiple nodes of each type and nodes of other types. For example, a miscellaneous node (MN) may facilitate synchronization of transactions, while a slave node (SN), such as a memory controller, may provide access to shared memory. In addition, the network may include Home Nodes (HN-I) that couple to memory mapped I/O slave devices. Home nodes (HN-I) serve the requests from request nodes for memory mapped I/O slave devices, for example. A given system can have more than one HN-I and I/O slave devices connected to it that are accessible using a unique system memory address.

The nodes described above are linked via an interconnect circuit 104 that comprises a collection of linked switches for controlling the flow of signals between the nodes.

Request node 102 contains a System Address Map (SAM) 200, which is a logic circuit for translating a memory address to a corresponding Home Node target ID (either on the same chip or on a remote chip). The SAM 200 translates the incoming request address to the corresponding HN-F Target ID within chip 110. Similarly, request node 102' in integrated circuit 120 contains a System Address Map (SAM) 200' that translates incoming request addresses to the corresponding HN-F Target ID's within chip 120.

The nodes (102, 112, 116 for example) and the interconnect circuit 104, which links them, form a network. Each node has a unique Network ID (identifier). Transactions, such as requests and responses, are contained in message packets. Each packet specifies a Target ID to send the packet to and a Source ID to be able to route the response.

Transactions may be routed to target nodes of the network using a System Address Map (SAM) 200, 200'. A System Address Map (SAM) may be integrated in any device (CPU, I/O master, etc.) that sends a request to access the data from memory and slave I/O devices in a data processing system. A System Address Map 200 is a logic circuit that determines which node of the network should be targeted when a device 102 requests access to a given memory address. A SAM 200 contains the memory map of the system and the corresponding target information.

The target node may be a local node on the same chip as the master device or a node (home nodes 112 are local to request node 112 in chip 110) on a different chip (home nodes 112' are on a different chip to request node 112). Thus a SAM may enable identification of the target device in systems with multiple targets.

Figure 2:
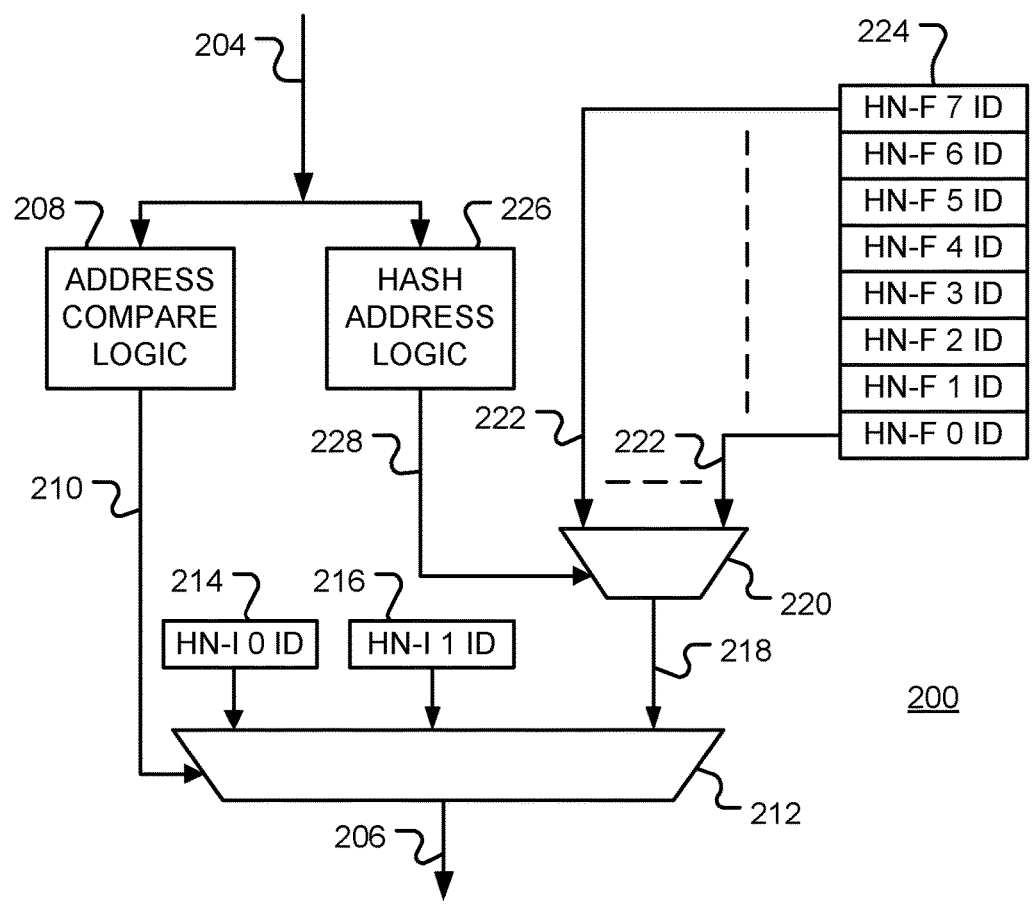
FIG. 2 is a block diagram of System Address Map (SAM) logic, in accordance with various representative embodiments.

FIG. 2 is a block diagram of System Address Map (SAM) logic 200, for a network in a single integrated circuit. The SAM 200 includes an input 204 that receives a system memory address and an output 206 that provide a corresponding target node identifier (ID). Address compare logic 208 provides an output 210 to control multiplexer 212 to select between identifiers (ID's) of home nodes. Multiplexer 212 selects between registers 214 and 216, which store the ID's of home nodes coupled to memory-mapped I/O device, and the output 218 from multiplexer 220. In turn, multiplexer 220 selects between links 222 to node register table 224. For example, register 216 is selected if the system memory address has been mapped to an I/O device coupled to the network via home node HN-1.

In a typical system, the number of memory addresses corresponding to memory locations is very much greater than the number of connected nodes in a network. A single home node may service requests for access to a large group of system memory addresses. The set of system memory addresses handled by a single home node may not be a contiguous range. Thus, it is impractical to use a simple look-up table to identify which node of the network should be targeted in order to access the memory resource associated with each memory address, or to use a memory map with address ranges assigned to ports. A solution to this problem is the use of a logic circuit 226 that implements a hash function. Node identifiers of target home nodes are stored in a register table 224. Hash address logic 226 receives a system memory address as input and provides, as output 228, an index or pointer to the entry in the register table 224 that stores an identifier of the node having access to that memory address. A Number of hash functions are known in the art and a hash function may be selected to provide a desired distribution of memory addresses between resources.

An example hash function for a system with eight nodes determines the identifier HN-F ID of a the home node is provided in TABLE 1 below.

TABLE 1

| addr  | HN-F ID | addr  | HN-F ID | addr  | HN-F ID |
|-------|---------|-------|---------|-------|---------|
| 0x000 | 0       | 0x200 | 1       | 0x400 | 2       |
| 0x040 | 1       | 0x240 | 0       | 0x440 | 3       |
| 0x080 | 2       | 0x280 | 3       | 0x480 | 0       |
| 0x0c0 | 3       | 0x2c0 | 2       | 0x4c0 | 1       |
| 0x100 | 4       | 0x300 | 5       | 0x500 | 6       |
| 0x140 | 5       | 0x340 | 4       | 0x540 | 7       |
| 0x180 | 6       | 0x380 | 7       | 0x580 | 4       |
| 0x1c0 | 7       | 0x3c0 | 6       | 0x5c0 | 5       |

Figures 3A, 3B:
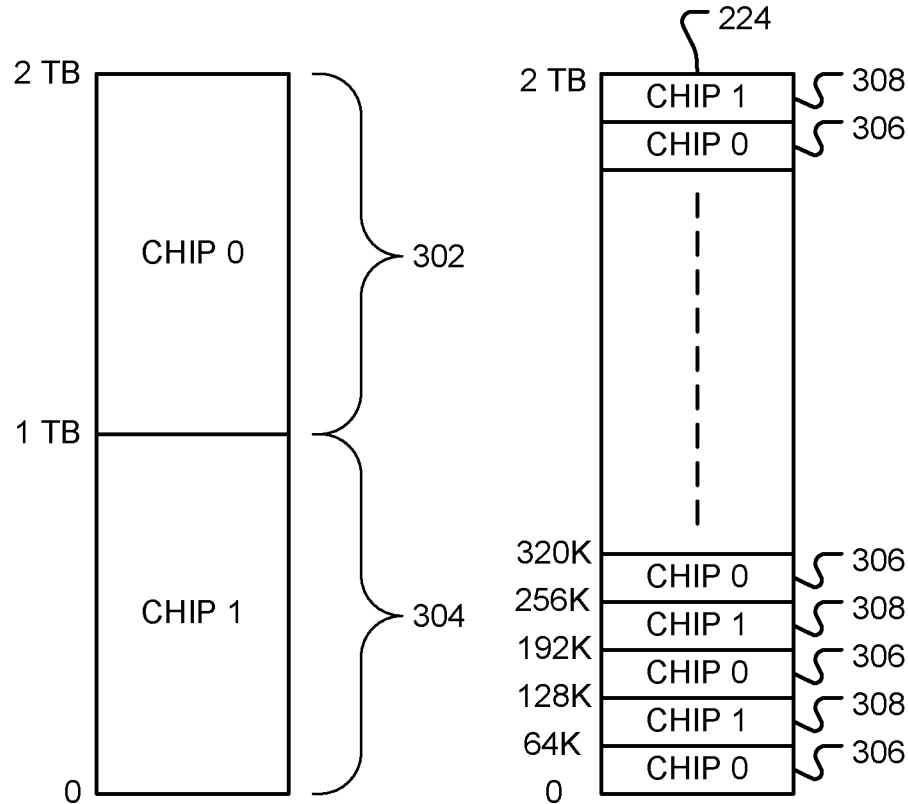
FIGS. 3A and 3B illustrate examples of memory configurations in a multi-chip data processing system, in accordance with various representative embodiments.

A physical system memory can be partitioned across two or more chips. FIGS. 3A and 3B illustrate examples of memory configurations in a two-chip data processing system. FIG. 3A illustrates system memory configured as two block of contiguous memory addresses. In this example, memory addresses 302 of the second terabyte of data correspond to memory on chip 0, while memory addresses 304 of the first terabyte of data correspond to memory on chip 1. FIG. 3B illustrates system memory arranged in smaller blocks distributed amongst the chips. Such a memory configuration may be referred to as 'fine grained interleaved'. In this example the addresses are allocated in interleaved blocks of 64 kilobytes, with blocks 306 on chip 0 and blocks 308 on chip 1. However, other block sizes may be used and the blocks may be allocated in a regular or irregular manner (e.g. of varying block sizes) between the chips. For a fine grained memory configuration, the 'address compare' approach is not practical for determining the target ID.

In a multi-chip system, a request from RN can be directed towards a local HN or an HN in a remote chip. For remote HN requests, the SAM selects the HN-C target ID that is associated with remote chip servicing the memory being accessed by the RN.

When the memory is partitioned as large contiguous blocks, as illustrated in FIG. 3A for example, a non-hashed target ID register can be used to associate the entire memory region.

Figure 4:
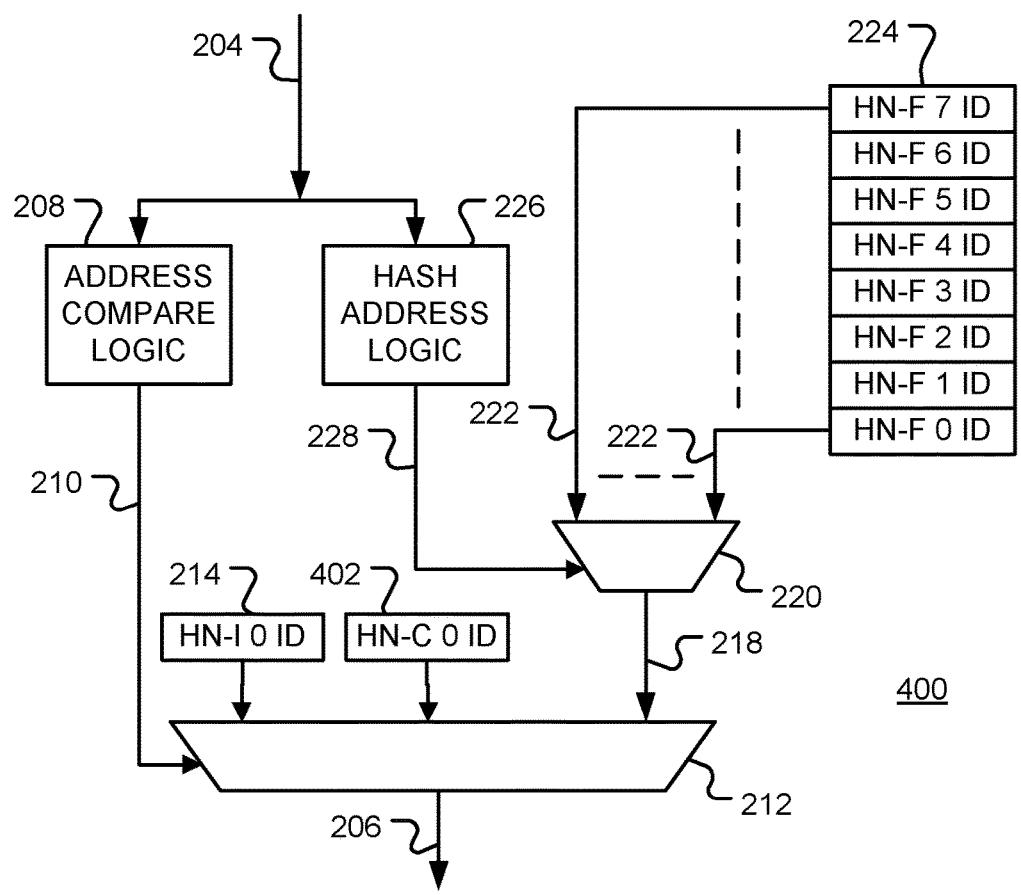
FIG. 4 is a block diagram of System Address Map (SAM) logic, in accordance with various representative embodiments.

FIG. 4 shows an example of a SAM circuit 400 where the non-hashed target register 402 is being used for remote-connection node HN-C 0. In this example, when the incoming address belongs to memory region of chip 1, SAM will select the HN-C0 target ID that serves as interface node for Chip 1 HN's. The hash address logic 226 generates an index 228 that is used as a pointer to select a HN-F target ID from the HN-F target ID register table 224. In this example, an 8×1 multiplexer is used for an interconnect circuit having 8 home nodes. The SAM 400 operates in a similar manner to that shown in FIG. 2, but enables access to off-chip data resources via one or more remote connection (HN-C) nodes. The identifier of an HN-C node is stored in register 402. When the address compared logic 208 determines that memory address at input 204 is in a data resource of another chip that is coupled to home node HN-C 0, the ID stored in register 402 is selected as the output 206. This causes the transaction request to be routed to the remote-connection node HN-C 0.

However, for a fine-grain interleaved memory across chips, as illustrated in FIG. 3B, the SAM circuit does not have enough non-hashed memory map registers and target ID registers to program all possible memory regions for each chip. Address compare logic 208 would become impractically complex to compare each of the address ranges. Thus, prior SAM's are unable to identify target nodes when a target is location on a different chip and where the target resource uses fine grained memory interleaving.

In accordance with certain representative embodiments of the present disclosure, the node register table 224 is modified such that when the memory address is located in the same integrated circuit as the request node, the corresponding node identifier stored in a register of the node register table comprises an identifier of a home node associated with the memory address. Further, when the memory address is located external to the integrated circuit, the corresponding node identifier is the identifier of the remote connection node that provides the interface to the off-chip memory resource associated with the memory address.

Figure 5:
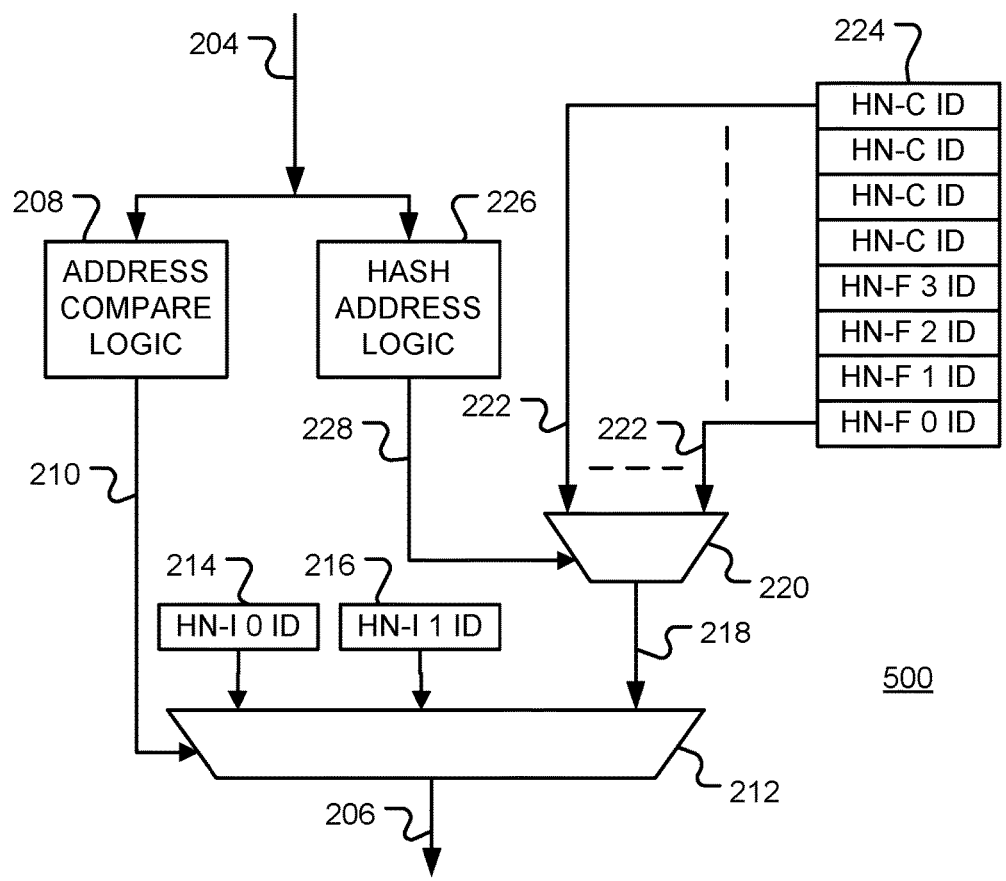
FIG. 5 is a block diagram of further System Address Map (SAM) logic, in accordance with various representative embodiments.

FIG. 5 is a block diagram of System Address Map (SAM) logic 500, in accordance with various representative embodiments. FIG. 5 illustrates a SAM register table for use in systems having two or more chips, in accordance with various representative embodiments. SAM register tables may be used to select HN-F's in the system including both local HN-F's and remote HN-F's. The SAM 500 operates in a similar manner to that in FIG. 2, but enables access to off-chip data resources via one or more HN-C nodes when the system memory configuration is fine-grained. In this example remote-connection node HN-C 1 couples to a chip having a memory resource and system memory addresses are dispersed between on-chip memory and off-chip memory. When the memory address is in the off-chip memory, the hash address logic outputs a pointer to a register of register table 224 holding the identifier of HN-C 1. Multiplexers 220 and 212 switch the selected identifier to output 206. This causes the transaction request to be routed to the remote-connection node HN-C 1.

Figure 6:
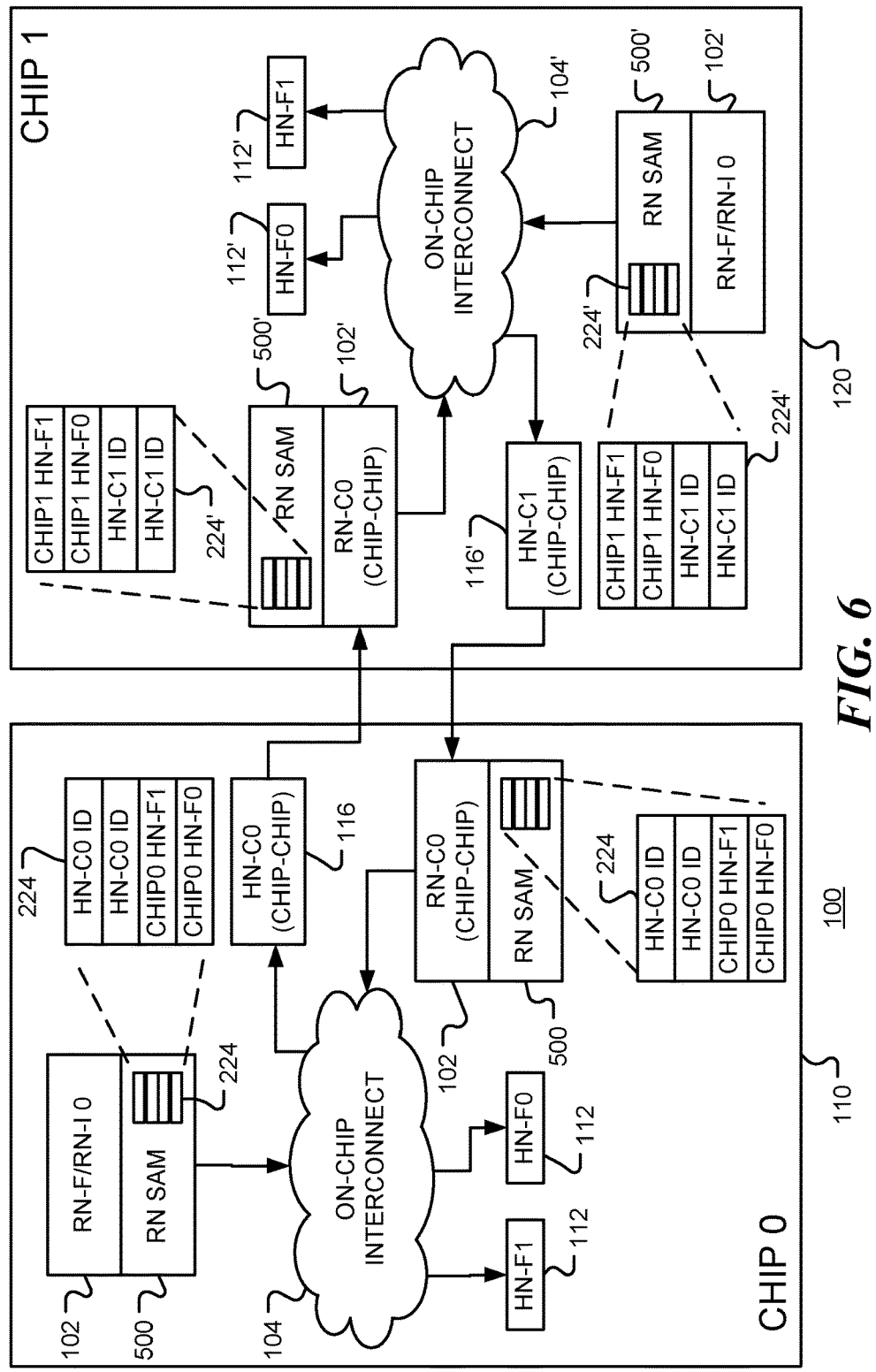
FIG. 6 is a block diagram of a multichip data processing system, in accordance with various representative embodiments.

FIG. 6 is a block diagram of a multichip data processing system 100, in accordance with various representative embodiments. The data processing system comprises integrated circuits 110 and 120, each comprising a network of linked nodes. The linked nodes include request nodes (RN's) 102 and 102' that generate requests for services from one or more shared resources such as memories. The shared resources are coupled to the network via nodes 112, 116, 112' and 116' that are referred to herein as home nodes (HN's). The HN's provide points of coherence or points of serialization that enables multiple requests to access the shared the resource in a coherent manner. The home nodes (HN's) include one or more remote-connection nodes (116 and 116') that provide an interface to off-chip resources external to the integrated circuit. The request nodes and home nodes are coupled via an interconnect circuit (104, 104') comprising a network of linked switches. This enables an on-chip request node to access a memory address in a data resource on a different chip. System Address Map (SAM) logic (500, 500') coupled to the request node is configured to enable the on-chip request node to access off-chip resources.

The SAM logic 500, for example, comprises a node register table 224 that stores node identifiers of the plurality of linked nodes, hash address logic of the SAM is operable to generate, from a memory address, a pointer to a register of the node register table 224, and a multiplexer of the SAM. The multiplexer is coupled to the node register table and responsive to the pointer. The multiplexer outputs a node identifier stored in the selected register of the node register table. When the memory address is located in the same integrated circuit as the request node, the corresponding node identifier stored in a register of the node register table comprises an identifier of a linked node associated with the memory address. When the memory address is located external to the integrated circuit, the corresponding node identifier is the identifier of the remote connection node that provides the interface to the off-chip memory resource associated with the memory address.

In any of these routing approaches, requests originating from an RN are sent to the appropriate HN's that is serving the specific address.

Integrated circuits 110 and 120, or portions thereof, may be produced by a computer controlled process. The circuits may be described by a hardware description language that includes, for example, descriptions of connections and routing information. The instructions of the hardware description language may be executed by a processor as part of a computer controlled production process that produces an integrated circuit. The instructions may be stored on a non-transient computer readable medium, such as a magnetic disc, optical disc or flash drive for example. The instructions may be distributed via a network such as the Internet or via a tangible medium.

TABLE 1

| ADDRESS | HN-F in CHIP |
|---------|--------------|
| 0x00    | Chip 0       |
| 0x40    | Chip 0       |
| 0x80    | Chip 0       |
| 0xC0    | Chip 0       |
| 0x100   | Chip 1       |
| 0x140   | Chip 1       |
| 0x180   | Chip 1       |
| 0x200   | Chip 1       |

Table 1 shows the HN-F target ID table in a two-chip system for both Chip 0 and Chip 1. With a 256-byte memory interleaving, 8 consecutive cache line requests would now be distributed among 4 HN-F's on chip 0 and 4 remote HN-F's on chip 1. As the hash function in SAM is the same on both chips, the HN-F target ID Table is inverted between the 2 chips, as shown in FIG. 6, for example.

Thus, when a request is being initially steered in chip-0, the physical address is looked up in the SAM. If the hash result hits HNF[1:0], the destination ID in chip 0 of HNF [1:0] results and the request is steered to that target. If the hash of the address matches any of the HN-C entries (indicating this memory is not handled on this chip), then the destination ID that results is the destination ID of the HN-C0 on chip 0. The request is then routed to that HN-C, with no information in the request (other than the physical address) to indicate where the request will actually go on chip 1.

When the request gets to the remote-connection node HN-C0 that connects to chip 1, the HN-C on chip 0 will know that the request should be sent to chip 1 (the only connection), and will also know the physical address of the request (which is still embedded in the request).

Remote-connection node HN-C0 will send the request across the link to chip 1 to its companion request node RN-C1. The request node RN-C1 will then look up the request in its copy of the SAM, which is flipped compared to the SAM in chip-0. On the chip 1 SAM, the hashed address will match an HNF[1:0] entry, will result in a chip 1 destination ID corresponding to those blocks, and the request will be steered to the correct chip 1 target.

Figure 7:
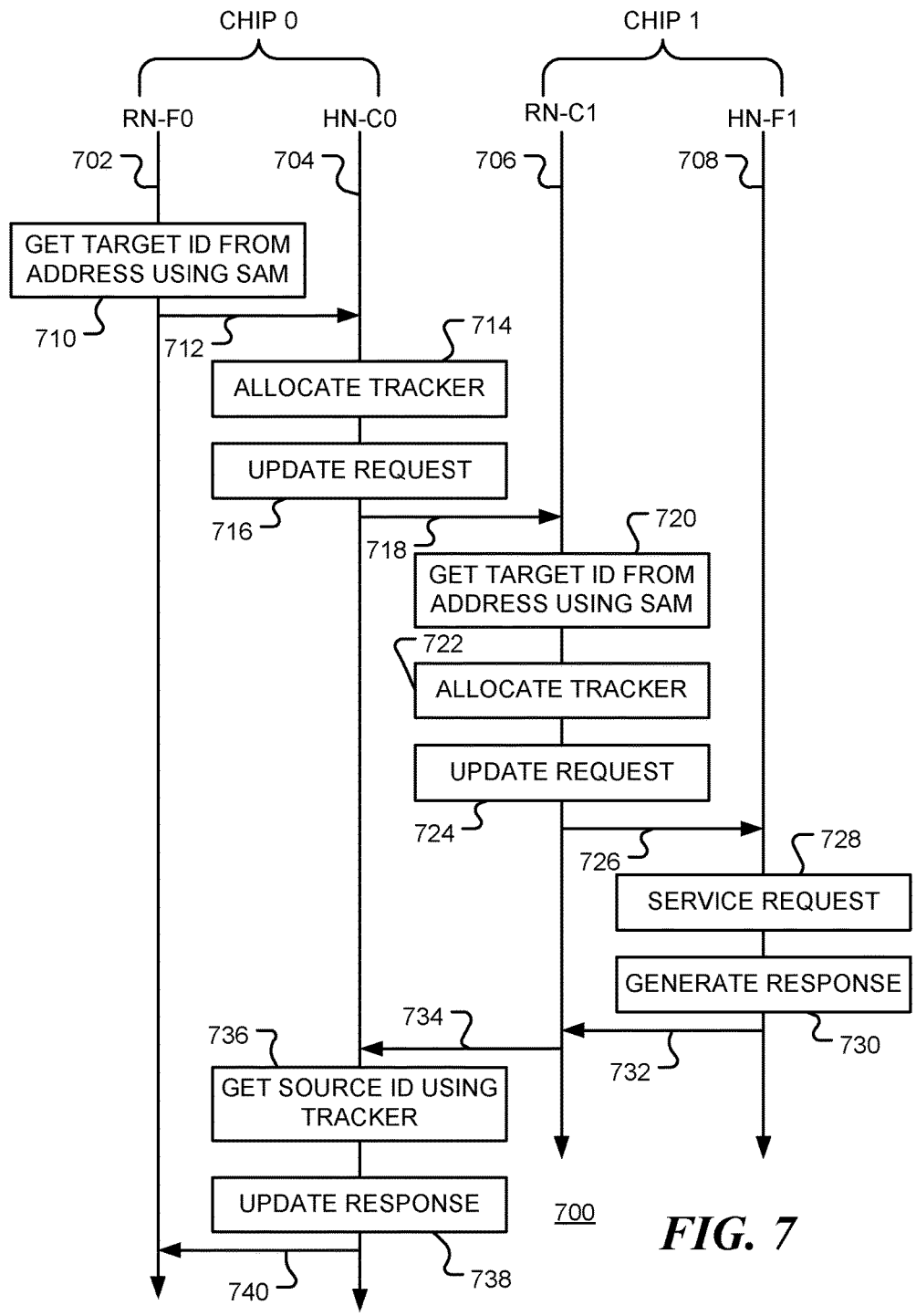
FIG. 7 is a flow chart of a method of operation of a multichip data processing system, in accordance with various representative embodiments.

FIG. 7 is a flow chart 700 of method for data retrieval in a multi-chip data processing system in accordance with certain embodiments. In the example shown, data requested from a request node on Chip 0 is retrieved from a memory address on a data resource on Chip 1. Time lines 702, 704, 706 and 708 are, respectively, associated with a request node and a home node on chip 0 and a request node and a home node on chip 1. At block 710, the request node on chip 0 uses the SAM and the memory address to provide an ID for a target home node on chip 0. For example, a read request (RD_A) is sent to the SAM within RN-F0. The request contains an address of the memory to be accessed. The SAM uses the address and translates it to a HN target ID. The resultant target ID can be a local-connection node HN-F on the same Chip or a remote-connection node HN-C if the target HN-F is on another chip. Since the RD_A request is a request to access memory space belonging to Chip 1, the HN-C0 target ID will be output from the SAM of RN-F0.

A request is sent to the target home node at 712. The request contains the memory address, a source ID of the request node and a transaction.

At 712, the RDA request is sent to the on-chip interconnect which uses the target ID of HN-C0 to route the packet to HN-C0.

HN-C0 receives the request from the interconnect circuit and, at block 714, allocates a tracker entry internally and keeps track of the source ID of the request (RN-F0 source ID). The control information in the request packet (such as Transaction ID, Source ID, etc.) may be updated at block 716.

The updated request packet is sent to the RN-C1 on chip 1 at 718. RN-C1 receives the request and, at block 720, uses the address from RD_A request to translate it to the final HN-F target ID. Since RD_A is accessing memory location serviced by HN-F1, it generates the Target ID of HN-F1. RN-C1 may also allocate the request in its own tracker at block 722 and updates the control information in the RD_A request at block 724.

The RD_A request is sent to HN-F1 at 726. The RD_A request, together with the HN-F1 target ID is sent to the on-chip interconnect circuit in Chip 1. The interconnect circuit then routes the request over to HN-F1 on Chip 1.

HN-F1 receives the RD_A request and service the request at block 728. When it is ready to send the requested Data back to the RN-F0 (from a built-in cache memory or from a downstream memory), it generates a response at 730 and sends the response back to interconnect with the target ID as RN-C1 at 732.

RN-C1 receives the data for RD_A, updates the control information using its tracker and, at 734, forwards packets with the updated control information to HN-C0.

HN-C0 looks up its tracker for RD_A control information at block 736, updates the control information of the response at block 738 and forwards the response back to RN-F0 via the interconnect of Chip 0 at 740.

Figure 8:
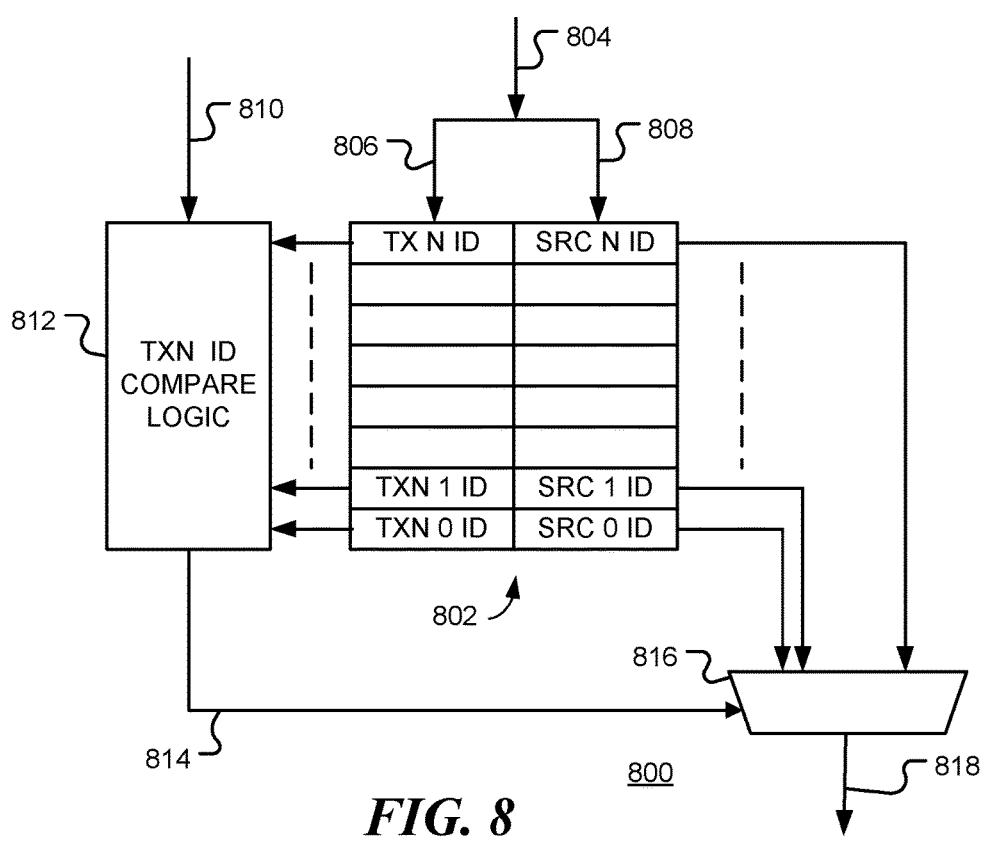
FIG. 8 is a block diagram of tracker logic of a network, in accordance with various representative embodiments.

FIG. 8 is a block diagram of tracker logic 800 of a home node HN-C in accordance with various representative embodiments. The tracker logic includes an allocation table 802 for storing control information 804 from a transaction request packet. In this example the control information comprises a transaction ID 806 and source ID 808, indicative of the source of the request. Each entry in the allocation table 802 associates a transaction ID with a source ID. For example, the ID of transaction TNX 0 is associated with the ID of source SRC 0. When a response 810 to a transaction is received from another chip, transaction ID compare logic 812 compares the transaction ID in the response packet with those stored in the table. When a match is found, control signal 814 controls multiplexer 816 to select the associated source ID from the table 802. The source ID is output at 818 and may be used to route the response using the local interconnect circuit. Other control information may be used instead of or in addition to the transaction ID. For example, the request may be updated with a new transaction ID and both new and original transaction ID's may be stored.

Various embodiments relate to an integrated circuit data processing system that includes system address map (SAM) logic. The SAM logic includes a node register table having registers that store node identifiers of linked nodes of a network. The node identifiers include an identifier of a remote-connection node that provides an interface to an off-chip data resource in an external integrated circuit and associated with a first set of system memory addresses, and an identifier of a local-connection node that provides an interface to an on-chip data resource in the integrated circuit and associated with a second set of system memory addresses. The SAM logic also includes hash address logic responsive to a memory address to provide a pointer to a register of the node register table, and a multiplexer, coupled to the node register table, that outputs a node identifier stored in the register of the node register table indicated by the pointer. An identifier stored in a register of the node register table comprises an identifier of the remote-connection node when the memory address is in the first set of system memory addresses, and an identifier of the local-connection node when the memory address is in the second set of system memory addresses.

A non-transient computer readable medium may be used to stored instructions of a hardware description language that describe the integrated circuit data processing system.

Various embodiments relate to a data processing system comprising a first integrated circuit, having a first data resource, and a second integrated circuit having a second data resource. The first integrated circuit includes a request node having system memory map logic, the request node operable to generate a transaction request that utilizes a system address associated with the first or second data resource, a local-connection node operable receive the transaction request when the system address is associated with the first data resource and further operable to communicate with the on-chip data resource to service the data request, a remote-connection node operable to receive the transaction request when the system address is associated with the second data resource and further operable to communicate with the second integrated circuit to service the transaction request, and an interconnect circuit that couples between the request node and the remote-connection node and between the request node and the local-connection node. The system address map logic is responsive to the system address to produce a node identifier such that the transaction request is routed to the local-connection node when the system address is associated with the first data resource and the transaction request is routed to the remote-connection node when the system address is associated with the second data resource.

A method is disclosed for accessing a data resource at a memory address in a data processing system comprising a first network of interconnected nodes in a first integrated circuit, an on-chip data resource in the first integrated circuit and associated with a first set of system memory addresses, and an off-chip data resource in the second integrated circuit and associated with a second set of system memory addresses, the first and second networks coupled via a remote-connection node of the first network. The method comprises, in the first integrated circuit, generating, by a first request node of the first network, a transaction request comprising a system address and an identifier of the first request node, producing, by hash address logic of the first integrated circuit, a pointer to a register of a first register table of node identifiers, the pointer being a first hash function of the system address, selecting, by a multiplexer, a target node identifier in the register of the first register table, and routing the transaction request through the first network to a first target node corresponding to the target node identifier. The target node identifier stored in a register of the first node register table includes an identifier of the local-connection node of the first network when the memory address is in the first set of system memory addresses, and an identifier of a remote-connection node of the first network when the memory address is in the second set of system memory addresses.

A method is disclosed for accessing a data resource at a system address in a data processing system comprising a network of interconnected nodes. The method comprises: selecting, from a system address, an identifier of a first home node of the network from a plurality of stored identifiers using hash function logic, generating, by a first request node of the network, a transaction request comprising the system address, an identifier of the first request node and a first transaction identifier, routing the transaction request to the first home node using the identifier of the first home node, storing the transaction request identifier and the identifier of the first request node of the transaction request and, when a transaction identifier of a received response to a transaction request matches the stored transaction request identifier, routing the received response to the first request node.

A method is disclosed for accessing a data resource at a system address in a data processing system comprising a first network of interconnected nodes in a first integrated circuit and a data resource in a second integrated circuit. The method comprises selecting, from the system address, an identifier of a target node of the first network, where the target node identifier is selected from a plurality of identifiers, generating, by a first request node of the first network, a first transaction request comprising the system address, an identifier of the first request node, and a transaction identifier, routing the first transaction request through the first network to the target node corresponding to the target node identifier. When the system address is in the data resource in the second integrated circuit, the target node: storing the transaction identifier and the identifier of the first request node of the first transaction request, transmitting the first transaction request to the second integrated circuit, receiving a response from the second integrated circuit, the response including a transaction identifier, and when the transaction identifier in the response matches the stored transaction identifier of the first transaction request, routing the response to the first transaction request node through the first network to the corresponding stored identifier of the first request node.

A method is disclosed for accessing a data resource at a system address in a data processing system comprising a first network of interconnected nodes in a first integrated circuit and a data resource in a second integrated circuit. The method comprises: selecting, from the system address, an identifier of a target node of the first network, where the target node identifier is selected from a plurality of identifiers, generating, by a first request node of the first network, a first transaction request comprising the system address, an identifier of the first request node, and a transaction identifier, routing the first transaction request through the first network to the target node corresponding to the target node identifier, and when the system address is in the data resource in the second integrated circuit, the target node, storing the transaction identifier and the identifier of the first request node of the first transaction request, transmitting the first transaction request to the second integrated circuit, receiving a response from the second integrated circuit, the response including a transaction identifier and, when the transaction identifier in the response matches the stored transaction identifier of the first transaction request, routing the response to the first transaction request node through the first network to the corresponding stored identifier of the first request node.

It will be appreciated that some or all functions described herein could be implemented by custom logic, such as a state machine, that has no stored program instructions, in one or more application specific integrated circuits (ASICs), in reconfigurable logic such as an FPGA, or in one or more programmed processors having stored instructions. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such integrated circuits, software instructions and programs with minimal experimentation.

As used herein, the term processor, controller or the like may encompass a processor, controller, microcontroller unit (MCU), microprocessor, graphics processing unit (GPU), a digital signal processor (DSP), a field programmable gate array (FPGA), an application specific integrated circuit (ASIC) device, a memory controller or an I/O master device.

Those skilled in the art will recognize that the present disclosure has been described in terms of exemplary embodiments, but it not so limited. The present disclosure could be implemented using hardware components, such as special purpose hardware and/or dedicated processors which are equivalents to the disclosure as described and claimed. Similarly, general purpose computers, microprocessor based computers, micro-controllers, optical computers, analog computers, dedicated processors and/or dedicated hard wired logic may be used to construct alternative equivalent embodiments of the present disclosure.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present disclosure. For example, the order of certain operations carried out can often be varied, additional operations can be added or operations can be deleted without departing from the disclosure. Error trapping can be added and/or enhanced and variations can be made in user interface and information presentation without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some aspects and features of the disclosed embodiments are set out in the following numbered items:

1. An integrated circuit data processing system comprising:
   system address map logic comprising:
      a node register table comprising a plurality of registers that store node identifiers of a plurality of linked nodes of a network, the node identifiers comprising an identifier of a remote-connection node that provides an interface to an off-chip data resource in an external integrated circuit and associated with a first set of system memory addresses, and an identifier of a local-connection node that provides an interface to an on-chip data resource in the integrated circuit and associated with a second set of system memory addresses;
      hash address logic responsive to a memory address to provide a pointer to a register of the node register table; and
      a multiplexer, coupled to the node register table, that outputs a node identifier stored in the register of the node register table indicated by the pointer,
   where an identifier stored in a register of the node register table comprises:
      an identifier of the remote-connection node when the memory address is in the first set of system memory addresses; and
      an identifier of the local-connection node when the memory address is in the second set of system memory addresses.

2. The integrated circuit data processing system of item 1, further comprising:
   a request node, comprising the system memory map logic and operable to generate a transaction request that utilizes the system memory address;
   a remote-connection node operable to receive the transaction request when the system memory address is in the first set of system memory addresses and further operable to communicate with the external integrated circuit to service the transaction request;
   a local-connection node operable receive the transaction request when the system memory address is in the second set of system memory addresses and further operable to communicate with the on-chip data resource to service the data request; and
   an interconnect circuit that couples between the request node and the remote-connection node and between the request node and the local-connection node, where the interconnect circuit is responsive to the node identifier output from the multiplexer to route the transaction request to the remote-connection node or the local-connection node.

3. The integrated circuit data processing system of item 2, where the remote-connection node comprises logic operable to:
   receive a transaction request from a request node;
   allocate a tracker dependent upon control information in the transaction request, the tracker comprising an identifier of the request node;

update control information in the transaction request; and
forward the transaction request to the external integrated
circuit.

4. The integrated circuit data processing system of item 3, wherein the tracker further comprises an identifier of the transaction request.

5. The integrated circuit data processing system of item 3, where the remote-connection node comprises further logic operable to:
   receive a transaction response from the external circuit;
   update control information in the transaction response to indicate the transaction request source; and
   forward the transaction request to the external integrated circuit.

6. The integrated circuit data processing system of item 1, further comprising:
   an on-chip data resource;
   a request node comprising the system address map logic and operable to:
      receive a first transaction request from an external integrated circuit, where the first transaction request utilizes a system memory address associated with the on-chip data resource;
      generate, by the system address map, a node identifier associated with the system memory address;
      generate, dependent upon the node identifier and the system memory address, a second transaction request;
   a local-connection node coupled to the on-chip data resource; and
   an interconnect circuit that couples between the request node and the local-connection node,
   where the local-connection node is operable to:
      receive the second transaction request from the request node via the interconnect circuit;
      service the second transaction request using the on-chip data resource to provide a first response to the second transaction request; and
      send the first response to the request node via the interconnect circuit, and
   where the request node is further operable to:
      receive the first response; and
      forward the response to the external integrated circuit.

7. A non-transient computer readable medium storing instructions of a hardware description language that describe an integrated circuit data processing system in accordance with item 1.

8. A data processing system comprising:
   a first integrated circuit comprising a first data resource; and
   a second integrated circuit comprising a second data resource;
   the first integrated circuit further comprising:
      a request node having system memory map logic, the request node operable to generate a transaction request that utilizes a system address associated with the first or second data resource;
      a local-connection node operable receive the transaction request when the system address is associated with the first data resource and further operable to communicate with the on-chip data resource to service the data request;
      a remote-connection node operable to receive the transaction request when the system address is associated with the second data resource and further operable to communicate with the second integrated circuit to service the transaction request; and
      an interconnect circuit that couples between the request node and the remote-connection node and between the request node and the local-connection node,
   where system address map logic is responsive to the system address to produce a node identifier such that the transaction request is routed to the local-connection node when the system address is associated with the first data resource and the transaction request is routed to the remote-connection node when the system address is associated with the second data resource.

9. A method for accessing a data resource at a memory address in a data processing system comprising a first network of interconnected nodes in a first integrated circuit, an on-chip data resource in the first integrated circuit and associated with a first set of system memory addresses, and an off-chip data resource in the second integrated circuit and associated with a second set of system memory addresses, the first and second networks coupled via a remote-connection node of the first network, the method comprising, in the first integrated circuit:
   generating, by a first request node of the first network, a transaction request comprising a system address and an identifier of the first request node;
   producing, by hash address logic of the first integrated circuit, a pointer to a register of a first register table of node identifiers, the pointer being a first hash function of the system address;
   selecting, by a multiplexer, a target node identifier in the register of the first register table; and
   routing the transaction request through the first network to a first target node corresponding to the target node identifier;
   where the target node identifier stored in a register of the first node register table comprises:
      an identifier of the local-connection node of the first network when the memory address is in the first set of system memory addresses; and
      an identifier of a remote-connection node of the first network when the memory address is in the second set of system memory addresses.

10. The method of item 9, further comprising:
    routing the transaction request to the first target node via an interconnect circuit using the identifier of the target node;
    servicing the transaction request using the first data resource when the memory address is in the first set of system memory addresses; and
    transmitting the transaction request to the second integrated circuit when the memory address is in the second set of system memory addresses.

11. The method of item 10, where transmitting the transaction request to the second integrated circuit comprises:
    allocating a tracker at the remote-connection node, the tracker comprising an identifier of the transaction request; and
    updating control information in the transaction request.

12. The method of item 11, further comprising:
    receiving, at the remote-connection node, a transaction response corresponding to the transaction request;
    determining, from the tracker, the identifier of the first request node;
    transmitting the transaction response to the request node via the interconnect circuit.

13. The method of item 10, further comprising, in the second integrated circuit:
    receiving the transaction request at a request node of the second network;

producing, by hash address logic of the second integrated circuit, a pointer to a register of a second register table of node identifiers, the pointer being the first hash function of the system address;

selecting, by a multiplexer, a target node identifier in the register of the register table;

updating control information in the transaction request to indicate the request node of the second network as the source node; and routing the transaction request through the second network to a second target node corresponding to the target node identifier;

where the target node identifier stored in a register of the second node register table comprises an identifier of a local-connection node of the second network when the memory address is in the second set of system memory addresses.

14. The method of item 13, further comprising:
in the second integrated circuit:
the second target node servicing the transaction request and sending a transaction response to the request node of the second work; and
the request node of the second network forwarding the transaction response to the remote-connection node of the first network, and
in the first integrated circuit:
the remote-connection node forwarding the transaction response to the request node of the first network via the interconnect circuit of the first network.

15. The method of item 9, further comprising:
the first request node of the first network receiving the transaction request from a remote-connection node of the second network;
the first request node of the first network transmitting a response to the transaction request to the remote-connection node of the second network;

16. A method for accessing a data resource at system address in a data processing system comprising a network of interconnected nodes, the method comprising:
selecting, from a system address, an identifier of a first home node of the network from a plurality of stored identifiers using hash function logic;
generating, by a first request node of the network, a transaction request comprising the system address, an identifier of the first request node and a first transaction identifier;
routing the transaction request to the first home node using the identifier of the first home node;
storing the transaction request identifier and the identifier of the first request node of the transaction request; and
when a transaction identifier of a received response to a transaction request matches the stored transaction request identifier, routing the received response to the first request node.

17. A method for accessing a data resource at a system address in a data processing system comprising a first network of interconnected nodes in a first integrated circuit and a data resource in a second integrated circuit, the method comprising:
selecting, from the system address, an identifier of a target node of the first network,
where the target node identifier is selected from a plurality of identifiers;
generating, by a first request node of the first network, a first transaction request comprising the system address, an identifier of the first request node, and a transaction identifier;

routing the first transaction request through the first network to the target node corresponding to the target node identifier; and when the system address is in the data resource in the second integrated circuit, the target node:
storing the transaction identifier and the identifier of the first request node of the first transaction request;
transmitting the first transaction request to the second integrated circuit;
receiving a response from the second integrated circuit, the response including a transaction identifier; and
when the transaction identifier in the response matches the stored transaction identifier of the first transaction request, routing the response to the first transaction request node through the first network to the corresponding stored identifier of the first request node.

What is claimed is:

1. An integrated circuit data processing system comprising:
system address map logic comprising:
a node register table comprising a plurality of registers that store node identifiers of a plurality of linked nodes of a network, the node identifiers comprising:
an identifier of an on-chip remote-connection node in the integrated circuit that provides an interface to an external integrated circuit that, in turn, provides a home node for a first data resource associated with a first set of system memory addresses, and
an identifier of an on-chip local-connection node in the integrated circuit that provides a home node for a second data resource associated with a second set of system memory addresses;
hash address logic responsive to a memory address to provide a pointer to a register of the node register table; and
a multiplexer, coupled to the node register table, that outputs a node identifier stored in the register of the node register table indicated by the pointer,
where an identifier stored in a register of the node register table comprises:
an identifier of the on-chip remote-connection node when the memory address is in the first set of system memory addresses; and
an identifier of the on-chip local-connection node when the memory address is in the second set of system memory addresses.

2. The integrated circuit data processing system of claim 1, further comprising:
a request node, comprising the system memory map logic and operable to generate a transaction request that utilizes the system memory address;
a remote-connection node operable to receive the transaction request when the system memory address is in the first set of system memory addresses and further operable to communicate with the external integrated circuit to service the transaction request, where the external integrated circuit includes a home node for the first set of system addresses;
a local-connection node operable receive the transaction request when the system memory address is in the second set of system memory addresses and further operable to communicate with the second data resource to service the data request, where the local-connection node is a home node for second set of system addresses; and an interconnect circuit that couples between the request node and the remote-connection node and between the request node and the local-connection node, where the interconnect circuit is responsive to the node identifier output from the multiplexer to route the transaction request to the remote-connection node or the local-connection node.

3. The integrated circuit data processing system of claim 2, where the remote-connection node comprises logic operable to:
  receive a transaction request from a request node;
  allocate a tracker dependent upon control information in the transaction request, the tracker comprising an identifier of the request node;
  update control information in the transaction request; and
  forward the transaction request to the external integrated circuit.

4. The integrated circuit data processing system of claim 3, wherein the tracker further comprises an identifier of the transaction request.

5. The integrated circuit data processing system of claim 3, where the remote-connection node comprises further logic operable to:
  receive a transaction response from the external circuit;
  update control information in the transaction response to indicate the transaction request source; and
  forward the transaction request to the external integrated circuit.

6. The integrated circuit data processing system of claim 1, further comprising:
  a request node comprising the system address map logic and operable to:
    receive a first transaction request from an external integrated circuit, where the first transaction request utilizes a system memory address associated with the second data resource;
    generate, by the system address map, a node identifier associated with the system memory address;
    generate, dependent upon the node identifier and the system memory address, a second transaction request;
  a local-connection node coupled to the second data resource; and
  an interconnect circuit that couples between the request node and the local-connection node,
where the local-connection node is operable to:
  receive the second transaction request from the request node via the interconnect circuit;
  service the second transaction request using the second data resource to provide a first response to the second transaction request; and
  send the first response to the request node via the interconnect circuit, and
where the request node is further operable to:
  receive the first response; and
  forward the response to the external integrated circuit.

7. A non-transient computer readable medium storing instructions of a hardware description language that describe an integrated circuit data processing system in accordance with claim 1.

8. A data processing system comprising:
  a first integrated circuit providing access to a first data resource; and
  a second integrated circuit providing access to a second data resource;
the first integrated circuit further comprising:
  a request node having system memory map logic, the request node operable to generate a transaction request that utilizes a system address associated with the first or second data resource;
  a local-connection node that is a home node for the first data resource, where the local connection node is operable to receive the transaction request when the system address is associated with the first data resource and is further operable to communicate with the first data resource to service the data request;
  a remote-connection node operable to receive the transaction request when the system address is associated with the second data resource and further operable to communicate with the second integrated circuit to service the transaction request; and
  an interconnect circuit that couples between the request node and the remote-connection node and between the request node and the local-connection node,
where system address map logic is responsive to the system address to produce a node identifier such that the transaction request is routed from the request node to the local-connection node when the system address is associated with the first data resource and the transaction request is routed from the request node to the remote-connection node when the system address is associated with the second data resource.

9. A method for accessing a data resource at a memory address in a data processing system comprising a first network of interconnected nodes in a first integrated circuit, first data resource accessible via a local-connection node in the first network and associated with a first set of system memory addresses, and second data resource accessible via the second integrated circuit and associated with a second set of system memory addresses, the first and second networks coupled via a remote-connection node of the first network, the method comprising, in the first integrated circuit:
  generating, by a first request node of the first network, a transaction request comprising a system address and an identifier of the first request node;
  producing, by hash address logic of the first integrated circuit, a pointer to a register of a first register table of node identifiers, the pointer being a first hash function of the system address;
  selecting, by a multiplexer, a target node identifier in the register of the first register table; and
  routing the transaction request through the first network to a first target node corresponding to the target node identifier;
where the target node identifier stored in a register of the first node register table comprises:
  an identifier of the local-connection node of the first network when the memory address is in the first set of system memory addresses; and
  an identifier of the remote-connection node of the first network when the memory address is in the second set of system memory addresses.

10. The method of claim 9, further comprising:
  routing the transaction request to the first target node via an interconnect circuit using the identifier of the target node;
  servicing the transaction request using the first data resource when the memory address is in the first set of system memory addresses; and
  transmitting the transaction request to the second integrated circuit when the memory address is in the second set of system memory addresses.

11. The method of claim 10, where transmitting the transaction request to the second integrated circuit comprises:
   allocating a tracker at the remote-connection node, the tracker comprising an identifier of the transaction request; and
   updating control information in the transaction request.

12. The method of claim 11, further comprising:
   receiving, at the remote-connection node, a transaction response corresponding to the transaction request;
   determining, from the tracker, the identifier of the first request node;
   transmitting the transaction response to the request node via the interconnect circuit.

13. The method of claim 10, further comprising, in the second integrated circuit:
   receiving the transaction request at a request node of the second network;
   producing, by hash address logic of the second integrated circuit, a pointer to a register of a second register table of node identifiers, the pointer being the first hash function of the system address;
   selecting, by a multiplexer, a target node identifier in the register of the register table;
   updating control information in the transaction request to indicate the request node of the second network as the source node; and
   routing the transaction request through the second network to a second target node corresponding to the target node identifier;
where the target node identifier stored in a register of the second node register table comprises an identifier of a local-connection node of the second network when the memory address is in the second set of system memory addresses where the local connection node of the second network is a home node for the second set of system memory addresses.

14. The method of claim 13, further comprising:
   in the second integrated circuit:
      the second target node servicing the transaction request and sending a transaction response to the request node of the second work; and
      the request node of the second network forwarding the transaction response to the remote-connection node of the first network, and
   in the first integrated circuit:
      the remote-connection node forwarding the transaction response to the request node of the first network via the interconnect circuit of the first network.

15. The method of claim 9, further comprising:
   the first request node of the first network receiving the transaction request from a remote-connection node of the second network; and
   the first request node of the first network transmitting a response to the transaction request to the remote-connection node of the second network.

16. A method for accessing a data resource at system address in a data processing system comprising a network of interconnected nodes, the method comprising:
   selecting, from a system address, an identifier of a first home node of the network from a plurality of stored identifiers using hash function logic;
   generating, by a first request node of the network, a transaction request comprising the system address, an identifier of the first request node and a first transaction identifier;
   routing the transaction request to the first home node using the identifier of the first home node;
   storing the transaction request identifier and the identifier of the first request node of the transaction request; and
   when a transaction identifier of a received response to a transaction request matches the stored transaction request identifier, routing the received response to the first request node.

* * * * *